United States Patent
Khatwa et al.

(10) Patent No.: US 9,710,218 B2
(45) Date of Patent: Jul. 18, 2017

(54) VERTICAL PROFILE DISPLAY INCLUDING HAZARD BAND INDICATION

(71) Applicant: Honeywell International Inc., Morristown, NJ (US)

(72) Inventors: Ratan Khatwa, Sammamish, WA (US); Santosh Mathan, Seattle, WA (US); Brian P. Bunch, Snohomish, WA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/326,145

(22) Filed: Jul. 8, 2014

(65) Prior Publication Data

US 2016/0011839 A1    Jan. 14, 2016

(51) Int. Cl.
| | |
|---|---|
| *G06F 3/147* | (2006.01) |
| *G06F 3/01* | (2006.01) |
| *G06F 3/0481* | (2013.01) |
| *G01S 13/95* | (2006.01) |
| *G01S 7/18* | (2006.01) |
| *G01S 7/22* | (2006.01) |
| *G01S 7/24* | (2006.01) |

(52) U.S. Cl.
CPC ............... *G06F 3/147* (2013.01); *G01S 7/18* (2013.01); *G01S 7/22* (2013.01); *G01S 7/24* (2013.01); *G01S 13/953* (2013.01); *G06F 3/01* (2013.01); *G06F 3/04812* (2013.01)

(58) Field of Classification Search
CPC ........ G06F 3/147; G06F 3/01; G06F 3/04812; G01S 13/953
See application file for complete search history.

(56) References Cited

U.S. PATENT DOCUMENTS

| | | | |
|---|---|---|---|
| RE33,152 E | 1/1990 | Atlas | |
| 4,940,987 A * | 7/1990 | Frederick | ............ G01S 7/24 342/180 |
| 5,049,886 A | 9/1991 | Seitz et al. | |

(Continued)

FOREIGN PATENT DOCUMENTS

| | | |
|---|---|---|
| EP | 2138864 A1 | 12/2009 |
| EP | 2216660 A2 | 8/2010 |

(Continued)

OTHER PUBLICATIONS

Mahapatra, "Chapter 12.5, Detection and surveillance of lightning phenomena," Aviation Weather Surveillance Systems: Advanced Radar and Surface Sensors for Flight Safety and Air Traffic Management, 1999, pp. 422-423.

(Continued)

*Primary Examiner* — Christopher E Leiby
(74) *Attorney, Agent, or Firm* — Shumaker & Sieffert, P.A.

(57) ABSTRACT

A vertical profile display includes weather information for an aircraft. In some examples, the weather is displayed in the vertical profile display with a hazard band indication. The hazard band indication includes an upper limit line positioned within the vertical profile view at a position corresponding to an altitude greater than or equal to an altitude above which no hazardous weather cells were detected. In some examples, the vertical profile display also includes one or more weather icons, with each weather icon indicating a weather condition for a volume of space.

22 Claims, 6 Drawing Sheets

(56) References Cited

U.S. PATENT DOCUMENTS

| | | |
|---|---|---|
| 5,198,819 A | 3/1993 | Susnjara |
| 5,202,690 A | 4/1993 | Frederick |
| 5,347,459 A | 9/1994 | Greenspan et al. |
| 5,398,033 A * | 3/1995 | Michie .................. G01S 13/953 342/180 |
| 5,781,146 A * | 7/1998 | Frederick .................. G01S 7/22 342/179 |
| 5,828,332 A | 10/1998 | Frederick |
| 5,907,568 A | 5/1999 | Reitan, Jr. |
| 5,920,276 A | 7/1999 | Frederick |
| 6,043,756 A | 3/2000 | Bateman et al. |
| 6,184,816 B1 | 2/2001 | Zheng et al. |
| 6,210,494 B1 | 4/2001 | Cole et al. |
| 6,236,351 B1 | 5/2001 | Conner et al. |
| 6,388,607 B1 | 5/2002 | Woodell |
| 6,405,134 B1 | 6/2002 | Smith et al. |
| 6,433,729 B1 | 8/2002 | Staggs |
| 6,597,305 B2 | 7/2003 | Szeto et al. |
| 6,646,559 B2 | 11/2003 | Smith |
| 6,650,275 B1 | 11/2003 | Kelly et al. |
| 6,667,710 B2 | 12/2003 | Cornell et al. |
| 6,690,317 B2 | 2/2004 | Szeto et al. |
| 6,707,415 B1 | 3/2004 | Christianson |
| 6,720,906 B2 | 4/2004 | Szeto et al. |
| 6,741,203 B1 | 5/2004 | Woodell |
| 6,839,018 B2 | 1/2005 | Szeto et al. |
| 6,879,280 B1 * | 4/2005 | Bull .................. G01S 7/18 342/175 |
| 6,882,302 B1 | 4/2005 | Woodell et al. |
| 7,042,387 B2 | 5/2006 | Ridenour et al. |
| 7,109,912 B1 | 9/2006 | Paramore et al. |
| 7,109,913 B1 * | 9/2006 | Paramore .............. G01S 13/953 342/176 |
| 7,132,974 B1 | 11/2006 | Christianson |
| 7,161,525 B1 | 1/2007 | Finley et al. |
| 7,242,343 B1 | 7/2007 | Woodell |
| 7,292,178 B1 | 11/2007 | Woodell et al. |
| 7,307,576 B1 | 12/2007 | Koenigs |
| 7,307,577 B1 | 12/2007 | Kronfeld et al. |
| 7,352,317 B1 | 4/2008 | Finley et al. |
| 7,365,673 B2 | 4/2008 | Makkapati et al. |
| 7,417,579 B1 * | 8/2008 | Woodell ................ G01S 13/953 342/159 |
| 7,427,943 B1 | 9/2008 | Kronfeld et al. |
| 7,471,995 B1 | 12/2008 | Robinson |
| 7,474,250 B2 | 1/2009 | Makkapati et al. |
| 7,477,164 B1 | 1/2009 | Barber |
| 7,486,220 B1 | 2/2009 | Kronfeld et al. |
| 7,492,304 B1 * | 2/2009 | Woodell .................. G01S 7/285 342/175 |
| 7,492,305 B1 * | 2/2009 | Woodell .................. G01S 7/064 342/26 A |
| 7,515,087 B1 | 4/2009 | Woodell et al. |
| 7,639,172 B2 * | 12/2009 | Chabah .................. G01S 7/064 342/195 |
| 7,656,343 B1 * | 2/2010 | Hagen .................. G01S 13/953 342/26 B |
| 7,688,254 B2 | 3/2010 | Khatwa |
| 7,696,920 B1 | 4/2010 | Finley et al. |
| 7,696,921 B1 | 4/2010 | Finley et al. |
| 7,817,078 B2 | 10/2010 | Bunch |
| 7,868,811 B1 | 1/2011 | Woodell et al. |
| 7,903,000 B2 | 3/2011 | Hammack et al. |
| 7,982,658 B2 | 7/2011 | Kauffman et al. |
| 8,059,024 B2 | 11/2011 | Christianson |
| 8,068,050 B2 | 11/2011 | Christianson |
| 8,111,186 B2 * | 2/2012 | Bunch .................. G01W 1/10 342/26 B |
| 8,159,369 B1 * | 4/2012 | Koenigs .................. G01S 7/062 340/963 |
| 8,228,227 B2 | 7/2012 | Bunch et al. |
| 8,244,418 B1 * | 8/2012 | Frank .................. G01C 23/00 701/14 |
| 8,289,202 B1 | 10/2012 | Christianson |
| 8,515,600 B1 * | 8/2013 | McCusker .............. G01S 13/94 340/963 |
| 8,994,578 B1 * | 3/2015 | Finley .................. G01S 13/953 342/179 |
| 2003/0001770 A1 | 1/2003 | Cornell et al. |
| 2003/0011505 A1 | 1/2003 | Szeto et al. |
| 2006/0004496 A1 * | 1/2006 | Tucker .................. G01C 23/00 701/4 |
| 2007/0164877 A1 * | 7/2007 | Mumaw .................. G01C 23/00 340/973 |
| 2008/0154493 A1 * | 6/2008 | Bitar .................. G01C 21/00 701/532 |
| 2009/0177343 A1 | 7/2009 | Bunch et al. |
| 2009/0322594 A1 * | 12/2009 | Khatwa .................. G01S 7/062 342/26 B |
| 2009/0326741 A1 * | 12/2009 | Marty .................. G01C 5/005 701/4 |
| 2010/0019938 A1 | 1/2010 | Bunch |
| 2010/0057362 A1 | 3/2010 | Schilke et al. |
| 2010/0073199 A1 | 3/2010 | Christophe et al. |
| 2010/0194628 A1 | 8/2010 | Christianson et al. |
| 2010/0201565 A1 * | 8/2010 | Khatwa .................. G01S 7/062 342/26 B |
| 2010/0302093 A1 | 12/2010 | Bunch et al. |
| 2011/0013016 A1 | 1/2011 | Tillotson |
| 2011/0187588 A1 * | 8/2011 | Khatwa .................. G01C 23/00 342/26 B |
| 2012/0050073 A1 | 3/2012 | Bunch et al. |
| 2012/0139778 A1 * | 6/2012 | Bunch .................. G01S 13/953 342/26 B |
| 2012/0203448 A1 | 8/2012 | Pepitone et al. |
| 2012/0232785 A1 | 9/2012 | Wiesemann et al. |
| 2013/0006511 A1 * | 1/2013 | Ramaiah .............. G08G 5/0004 701/120 |
| 2013/0215023 A1 * | 8/2013 | Bourret .................. G06F 3/013 345/157 |
| 2014/0039731 A1 * | 2/2014 | Leberquer ............... B64C 19/00 701/3 |
| 2014/0118188 A1 | 5/2014 | Khatwa et al. |

FOREIGN PATENT DOCUMENTS

| | | |
|---|---|---|
| EP | 2354805 A1 | 8/2011 |
| JP | 2000131458 A | 5/2000 |
| JP | 2000206245 A | 7/2000 |

OTHER PUBLICATIONS

U.S. Appl. No. 14/326,201, by Honeywell International Inc. (Inventors: Ratan Khatwa et al.), filed Jul. 8, 2014.

U.S. Appl. No. 14/326,112 by Honeywell International Inc. (Inventors: Ratan Khatwa et al.), filed Jul. 8, 2014.

Churma et al., "Evaluation of the AWIPS thunderstorm product," Techniques Development Laboratory, Office of Systems Development, National Weather Service, NOAA, 1996, 6 pp. (Note: Applicant points out in accordance with MPEP 609.04(a) that the 1996 year of publication is sufficiently earlier than the effective U.S. filing date and any foreign priority date of Jul. 8, 2014 so that the particular month of publication is not in issue.).

Darcangelo, "Forecasting the onset of cloud-ground lightning using layered vertically integrated liquid water," A Thesis in Meteorology, Pennsylvania State University, Aug. 2000, 71 pp.

Fitzgerald, "Probable aircraft 'triggering' of lightning in certain thunderstorms," Air Force Cambridge Research Laboratories, vol. 95(12), Dec. 1967, pp. 835-842.

Foote et al., "Hail metrics using conventional radar," 16th Conference on Planned and Inadvertent Weather Modification, Jan. 10, 2005, 6 pp.

Futyan et al., "Relationships between lightning and properties of convective cloud clusters," Geophysical Research Letters, vol. 34, L15705, Aug. 2007, 5 pp.

Goodman et al., "The North Alabama Lightning Mapping Array: Recent severe storm observations and future prospects," Atmospheric Research, vol. 76, Jul./Aug. 2005, pp. 423-437.

(56) References Cited

OTHER PUBLICATIONS

Gremillion et al., "Thunderstorm characteristics of Cloud-to-Ground lightning at the Kennedy Space Center, Florida: A study of lightning initiation signatures as indicated by the WSR-880," Weather Forcasting, vol. 14(5), Oct. 1999, pp. 640-649.
Uman et al., "The interaction of lightning with airborne vehicles," Progress in Aerospace Sciences, vol. 39, Jan. 2003, pp. 61-81.
Waldvogel et al., "Criteria for the detection of hail cells," American Meteorological Society, Dec. 1979, pp. 1521-1525.
Weems et al., "Lightning watch and warning support to spacelift operations," 18th Conference on Weather Analysis and Forecasting and the 14th Conference on Numerical Weather Prediction, Aug. 1, 2001, 5 pp.
Wilson et al., "The complementary use of TITAN-derived radar and total lightning thunderstorm cells," 32nd Conference on Radar Meteorology, Oct. 26, 2005, pp. 1-10, sections 2, 3, 4 and 5.
Prosecution History from U.S. Appl. No. 12/641,065, dated Mar. 4, 2011 through Aug. 16, 2011, 23 pp.
Prosecution History from U.S. Appl. No. 12/641,149, dated Jun. 15, 2011 through Sep. 29, 2011, 24 pp.
Heidorn, K.C., "For Strong Winds: Weather Satellites and Tropical Storms, More Than Cloud Imagery Sidebar," The Weather Doctor, Sep. 1, 2009, retrieved from https://www.islandnet.com/~see/weather/storm/wsat_instrument.htm on Feb. 2, 2014, 9 pp.
Honeywell/MyAerospace Catalog System Display—MFRD, 2013 Honeywell International Inc., retrieved from https://myaerospace.honeywell.com/wps/myportal/aero, 1 pp.
"Honeywell Technology Helps Pilots Avoid Hail and Lightning, Improving Passenger Safety and Comfort: Major upgrade of Honeywell IntuVue 3-D Weather RAdar helps increase pilot in-flight situational awareness and improves decision-making around adverse weather," PR Newswire, Aug. 15, 2012, Abstract, retrieved from http://search.proquest.com on Dec. 5, 2013, 3 pp.
Extended Search Report from counterpart European Application No. 15171541.4, dated Dec. 2, 2015, 7 pp.
Response to the Extended Search Report dated Dec. 2, 2015, from counterpart European Application No. 15171541.4 filed Jul. 10, 2016, 18 pp.
Office Action from U.S. Appl. No. 14/326,201, mailed Jan. 11, 2017, 10 pp.
Office Action from U.S. Appl. No. 14/326,112, dated Feb. 15, 2017, 15 pp.
Response to Office Action mailed Jan. 11, 2017, from U.S. Appl. No. 14/326,201, filed Apr. 5, 2017, 11 pp.
Response to Office Action mailed Feb. 15, 2017, from U.S. Appl. No. 14/326,112, filed May 12, 2017, 5 pp.
Final Office Action from U.S. Appl. No. 14/326,201, dated Apr. 20, 2017, 11 pp.

\* cited by examiner

VERTICAL PROFILE DISPLAY INCLUDING HAZARD BAND INDICATION

TECHNICAL FIELD

The disclosure relates to aircraft weather systems and methods.

BACKGROUND

In some cases, a weather system of an aircraft includes a display that provides a visual indication of weather conditions proximate the aircraft. The weather system can determine the weather based on, fur example, a radar system onboard the aircraft.

SUMMARY

The disclosure describes example devices, systems, and techniques for generating and presenting a vertical profile display including weather information for an aircraft. In some examples, the weather information includes a hazard band indication that indicates a vertical extent of detected hazardous weather. The hazard band indication includes an upper limit line that is displayed (within the vertical profile display) at an altitude greater than or equal to a highest altitude above which no hazardous weather is detected. In some examples, the hazard band indication further comprises a lower limit line; the upper and lower limit lines define a hazard block representing a range of altitudes in which hazardous weather was detected, and, therefore, may represent a range of altitudes that should be avoided by the aircraft.

In addition, in some examples, the vertical profile display may include one or more weather icons, each weather icon indicating a weather condition for a particular volume of space at a particular altitude. The weather icons are displayed within the vertical profile display at the particular altitude, to enable a user to quickly ascertain the location of particular weather conditions from the vertical profile display. A vertical profile display that presents the weather icons together with the hazard band indication may help a user relatively quickly ascertain the type of weather indicated by the hazard band indication.

In one aspect, the disclosure is directed to a method comprising receiving, by a processor, weather information, determining, by the processor and based on the weather information, a first altitude above which there is no hazardous weather, and generating, by the processor, a vertical profile display based on the weather information, wherein the vertical profile display comprises a hazard band indication including an upper limit line positioned within the vertical profile display at a position that corresponds to a second altitude greater than or equal to the first altitude.

In another aspect, the disclosure is directed to a system comprising a display and a processor configured to receive weather information, determine a first altitude above which there is no hazardous weather detected based on the weather information, generate a vertical profile display based on the weather information, and present the vertical profile display via the display, wherein the vertical profile display comprises an upper limit line positioned within the vertical profile display at a position corresponding to a second altitude greater than or equal to the first altitude.

In another aspect, the disclosure is directed to a computer-readable medium containing instructions. The instructions, when executed by a processor, cause the processor to receive weather information, determine, based on the weather information a first altitude above which there is no hazardous weather, and generate a vertical profile display based on the weather information, wherein the vertical profile display comprises a hazard band indication including an upper limit line at a position within the vertical profile display that corresponds to a second altitude greater than or equal to the first altitude.

In another aspect, the disclosure is directed to a system comprising means for receiving weather information, means for determining, based on the weather information, a first altitude above which there is no hazardous weather, and means for generating a vertical profile display based on the weather information, wherein the vertical profile display comprises a hazard band indication including an upper limit line positioned within the vertical profile display at a position that corresponds to a second altitude greater than or equal to the first altitude.

In another aspect, the disclosure is directed to an article of manufacture comprising a computer-readable storage medium. The computer-readable storage medium comprises computer-readable instructions for execution by a processor. The instructions cause the processor to perform any part of the techniques described herein. The instructions may be, for example, software instructions, such as those used to define a software or computer program. The computer-readable medium may be a computer-readable storage medium such as a storage device (e.g., a disk drive, or an optical drive), memory (e.g., a Flash memory, read only memory (ROM), or random access memory (RAM)) or any other type of volatile or non-volatile memory that stores instructions (e.g., in the form of a computer program or other executable) to cause a processor to perform the techniques described herein. The computer-readable medium is non-transitory in some examples.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
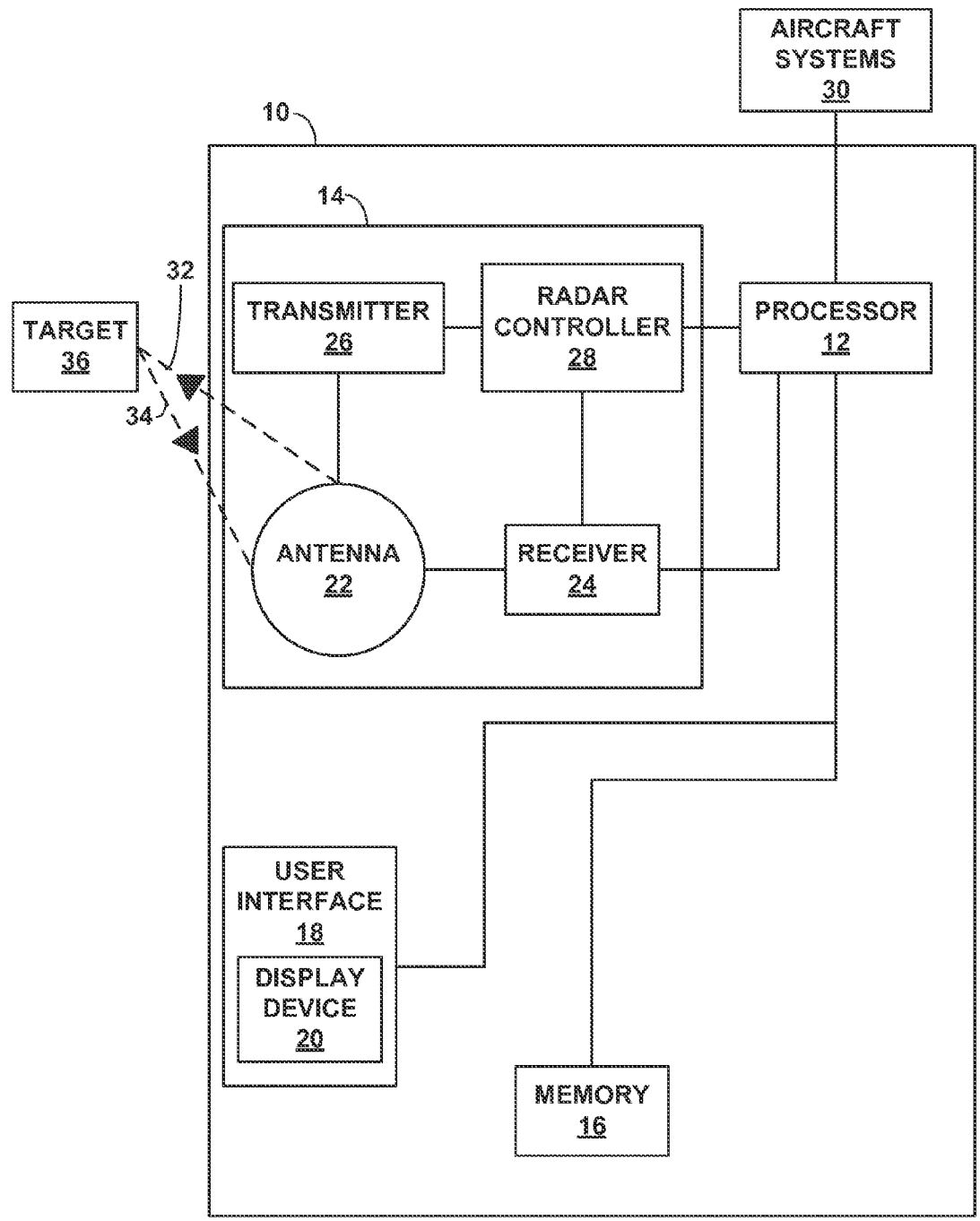
FIG. 1 is a block diagram illustrating details of an example weather system configured to display weather information for an aircraft, in accordance with one or more aspects of the present disclosure.

In examples described herein, a system is configured to generate and present a graphical user interface that includes weather information for an aircraft. The graphical user interface may include, for example, a vertical profile view (also referred to as a vertical situational display or a vertical profile display) of a flight path of an aircraft (or another terrain) and a hazard band indication that indicates a vertical extent of detected hazardous weather. The hazard band indication includes at least one limit line that indicates the altitude boundary for the hazard band. For example, the hazard band indication may include an upper limit line displayed within the vertical profile view at an altitude above which there are no detected (or otherwise known) hazardous weather cells. For example, based on received weather information, the system may determine a first altitude above which there is no hazardous weather. The system may generate a graphical user interface including a vertical profile view including an upper limit line displayed at a second altitude, the second altitude being greater than or equal to the first altitude. In some examples, the system selects the second altitude such that there is no detected hazardous weather above the upper limit line. Thus, the upper limit line may define an altitude threshold above which no hazardous weather was detected. In some cases, the extent to which hazardous weather may be detected may be limited by the weather information with which the system detects the hazardous weather.

In some examples, the upper limit line may be a straight line. In other examples, the upper limit line may not be a straight line, e.g., may be curvilinear or composed of a plurality of lines. For example, the upper limit line may follow the upper altitude of one or more detected hazardous weather cells, such that, for each point on the horizontal axis, the upper limit line is at an altitude corresponding to the maximum altitude for the hazardous weather at that point on the horizontal axis.

A vertical profile display represents a vertical view (e.g., a cross-section) of a volume of space, and illustrates a plurality of attitudes. When a graphical object, text, or the like is described herein as being positioned at a particular altitude within the vertical profile display, the graphical object, text, or the like is displayed at a position within the vertical profile view corresponding to the particular altitude. Thus, by viewing the vertical profile display, the altitude of various weather information indicated by the graphical object, text, or the like, in the volume of space represented by the vertical profile view is readily ascertainable.

The hazard band indication may provide one graphical indication of the vertical extent of multiple detected hazardous weather cells, rather than separate graphical indications for each detected hazardous weather cell. In this way, the hazard band indication may simplify the display of weather information, as well as the amount of time required for a pilot (or other user) to determine the altitude at which an aircraft may be flown to avoid flying into or under detected hazardous weather cells.

In some examples, the hazard band indication indicates a range of altitudes in which hazardous weather is detected. For example, the hazard band indication may comprise upper and lower limit lines that bound the altitudes between hazardous weather was detected. The system may determine a third altitude below which there is no hazardous weather and generate a lower limit line displayed in the vertical profile display at a fourth altitude less than or equal to the third altitude. In some examples, the fourth altitude is zero, i.e., at the ground. The combination of the upper limit line and the lower limit line may define a hazard block, which indicates a range of attitudes for which flight should be avoided. In examples in which the hazard band indication includes only an upper limit line or examples in which the lower limit line is displayed at ground level, the hazard block may be defined between the upper limit line and the ground.

The limit lines described herein may each be displayed with a visual characteristic that is visually distinct from the remainder of the vertical profile display. The limit lines may be displayed with any suitable graphical features. For example, in some examples, the visual characteristic may be associated with the type of hazardous weather detected. In some examples, the vertical profile display may further include a textual altitude indication that indicates the altitude of the one or more limit lines.

In some examples, the vertical profile display may include one or more weather icons that indicate a weather condition for a particular volume of space. Example weather conditions that may be presented by a weather icon include, hut are not limited to, air turbulence, windshears, microbursts, volcanic ash, storms, rain, snow, hail, low-visibility areas, and high-altitude ice crystals. Each weather condition may associated with a visually distinct weather icon, wherein the visually distinctness may be provided by one or more graphical attributes (e.g., color coding, line weight, cross-hatching, shading, or the like) of the weather icon or otherwise associated with the weather icon (e.g., surrounding the icon). The system may determine, based on received weather information, a weather condition and an associated altitude of the detected weather condition. The system may select a weather icon based on the determined weather condition and display the weather icon in a vertical profile display at the associated altitude of the weather condition. In this way, the weather icon may not only indicate the type of detected weather, but also the altitude (e.g., a specific altitude or a range of altitudes) of the detected weather, and, therefore, provides a localized weather depiction. In this way, a vertical profile display including weather icons at specific attitudes may help a user more quickly ascertain the vertical extent of detected weather cells.

In some examples, in addition to the hazard band indication, a graphical user interface that includes a vertical profile view may also include a plurality of weather blocks. Each weather block indicates the weather in a volume of space associated with the block. For example, each weather block may include one or more graphical attributes (e.g., color coding, line weight, cross-hatching, shading, or the like) that indicates the severity of the weather in a volume of space represented by the weather block. The weather blocks may be stacked vertically (in a direction in which altitude is measured) and horizontally (in a direction associated with forward travel of the aircraft) in the vertical profile display to define detected weather cells. The vertical extent of the weather blocks may indicate the altitude of the detected weather cell, and the horizontal extent of the weather blocks may indicate the horizontal extent (measured along the ground) of the detected weather cell. In some examples, the system generates the weather information based on radar reflectivity data from a radar system onboard the aircraft, a weather reporting service, weather data from other aircraft, or any combination thereof. In some examples, the weather icons indicating the weather at a particular altitude may be associated with a particular weather block and display in conjunction with the weather block (e.g., in the weather block or next to the weather block).

In some examples, the vertical profile display includes an indication of primary weather and an indication of secondary weather that is visually distinct from the indication of primary weather. Primary weather may be weather that is within a predetermined altitude range of an aircraft's expected flight path. Secondary weather may be weather that is outside of the predetermined altitude range of an aircraft's expected flight path. Weather can include, for example, storm cells, turbulence regions, clouds, precipitation, hail, snow, icing conditions, wind shear, volcanic ash, and the like that an aircraft may encounter. For example, a processor can be configured to receive radar reflectivity data from a radar system onboard an aircraft, and, based on the radar reflectivity data, determine the weather in an altitude band defined relative to a flight path (e.g., a current flight path or an expected flight path, or both) for the aircraft (e.g., centered at the flight path or otherwise including the flight path), and determine the weather outside of the altitude band. Techniques of this disclosure may be implemented with a variety of different types of flight paths, including vertical flight paths and lateral flight paths, among other types. The processor may categorize the weather inside the altitude band as primary weather and the weather outside the altitude band as secondary weather.

The processor can generate a vertical profile display that illustrates at least part of a flight path of the aircraft, as well as indications of the primary weather and the secondary weather that falls within the bounds of the vertical profile display.

The vertical profile displays disclosed herein that include hazard band indications and, in some examples, weather icons, weather blocks, and indications of primary and secondary weather present weather information in a manner that relates it to the current or expected flight path of the aircraft, which may enhance a flight crew's overall situational awareness. Knowing both horizontal travel distance from storm cells (or other adverse weather conditions) and the altitude of the storm cells in relation to an expected flight path may better allow pilots to safely navigate the aircraft relative to the potentially adverse weather conditions. Unlike lateral weather displays, the vertical profile displays described herein display weather information relative to altitude, which may enable a pilot to quickly ascertain, from the vertical profile view, the vertical extent of a detected weather cell. This may be useful for vertical flight path management.

Displaying weather information in a vertical profile view allows for conflict awareness and alerting to these external weather hazards, as the specific, three-dimensional location data for this weather information can be directly compared to a flight path, warning a pilot if the flight path may lead to an intersection with the detected weather. The vertical profile view may also allow pilots to see weather information that may affect any alterations to a flight path but that is not currently directly in the direct vicinity of the flight path, i.e., secondary weather.

FIG. 1 is a block diagram illustrating details of an example system 10 configured to generate and display a vertical profile display that includes a hazard band indication and, in some examples, weather icons. System 10 may be onboard an aircraft (also referred to as an "ownship") in some examples, and may be external to the aircraft in other examples. System 10 includes processor 12, weather radar system 14, memory 16, and user interface 18, which includes display device 20. Processor 12 may be electrically coupled to radar system 14, user interface 18, and memory 16. Processor 12 may also be configured to communicate with other various aircraft systems 30, which may include, for example, a flight management system (FMS), an air data computer (ADC), a Inertial Navigation System (INS), a Global Positioning System (GPS), or any combination thereof.

Processor 12, as well as other processors disclosed herein (including radar controller 28 discussed below), can comprise any suitable arrangement of hardware, software, firmware, or any combination thereof, to perform the techniques attributed to processor 12 herein. For example, processor 12 may include any one or more macroprocessors, digital signal processors (DSPs), application specific integrated circuits (ASICs), field programmable gate arrays (FPGAs), or any other equivalent integrated or discrete logic circuitry, as well as any combinations of such components. Memory 16 includes any volatile or non-volatile media, such as a RAM, ROM, non-volatile RAM (NVRAM), electrically erasable programmable ROM (EEPROM), flash memory, and the like. Memory 16 may store computer readable instructions that, when executed by processor 18 cause processor 12 to implement the techniques attributed to processor 12 herein.

Processor 12 is configured to generate weather information (from which weather blocks may be generated) based on signals received from various aircraft flight systems, such as based on radar reflectivity data from radar system 14, based on weather information received from a weather reporting service, based on weather information received from other aircraft, or any combination thereof. Although not specifically shown in FIG. 1, aircraft systems 30 may include a communication system configured to receive weather information from the weather reporting service, from other aircraft, or both. Examples in which processor 12 generates the vertical profile displays described herein based on weather information from radar system 14 are primarily described herein. The techniques, however, may be applied to generate the vertical profile displays based on weather information from another source, such as a weather reporting service, from other aircraft, or both.

In the example shown in FIG. 1, radar system 14 includes antenna 22, receiver 24, transmitter 26, and radar controller 28. Under the control of radar controller 28, transmitter 26 is configured to generate and transmit radar signals 32 from antenna 22 into airspace proximate the aircraft, and receiver 24 is configured to receive, via antenna 22, return signals (reflectivity values) if a target 36 is present to scatter energy back to the receiver. Target 36 can be, for example, a weather object, and the reflectivity data may corresponds to that portion of the signal reflected back to the radar by liquids (e.g., rain) and/or frozen droplets (e.g., hail, sleet, and/or snow) residing in a weather object, such as a cloud or storm, or residing in areas proximate to the cloud or storm generating the liquids and/or frozen droplets.

In some examples, radar controller 28 controls transmitter 26 and receiver 24 to send and receive signals 32, 34, respectively, via the antenna 22 based on aircraft data (e.g., position, heading, roll, yaw, pitch, and the like) received from aircraft systems 30.

In some examples, radar controller 28 digitizes the return signals 34 and sends the digitized signals to processor 12. Processor 12 may receive the radar returns data from radar system 14 and store the radar return data in memory 16. In some examples, processor 12 may translate the received return signals for storage in a three-dimensional (3D) buffer in memory 16. For example, radar system 14 may be configured scan the entire 3D space in front of the aircraft, and processor 12 may store all reflectivity data in an earth-referenced 3D (or "volumetric") memory buffer. Processor 12 can update the buffer with radar reflectivity data from new scans. In some examples, processor 12 updates the data in the buffer every 30 seconds, although other update frequencies can also be used. Processor 12 can then extract reflectivity data from the buffer to generate the desired weather information without having to make and wait for view-specific antenna scans. With the 3D volumetric buffer data, the presentation of the vertical profile display is not constrained to a single tilt-plane that is inherent to conventional radar. This volumetric memory buffer enables processor 12 to integrate weather returns on a vertical profile display, as described herein.

Example 3D volumetric buffers, example radar systems, or both, are described in U.S. Pat. No. 4,940,987 to Frederick, U.S. Pat. No. 5,202,690 to Frederick, U.S. Pat. No. 5,781,146 to Frederick, U.S. Pat. No. 5,828,332 to Frederick, U.S. Pat. No. 5,920,276 to Frederick, U.S. Pat. No. 6,597,305 to Szeto et al, U.S. Pat. No. 6,667,710 to Cornell et al., U.S. Pat. No. 6,690,317 to Szeto et al., U.S. Pat. No. 6,707,415 to Christianson, U.S. Pat. No. 6,720,906 to Szeto et al., U.S. Pat. No. 6,839,018 to Szeto et al., U.S. Pat. No. 8,068,050 to Christianson, U.S. Pat. No. 8,111,186 to Bunch et al., and U.S. Pat. No. 8,289,202 to Christianson, the entire contents of which are incorporated herein by reference.

Processor 12 is configured to determine weather proximate aircraft 12 based on the radar reflectivity data (also referred to herein as radar return data) provided by radar system 14. For example, processor 12 may identify the type of detected weather objects (also referred to herein as "weather cells" in some examples) proximate the aircraft, such as rain/moisture, windshear, or turbulence based on the radar reflectivity data and a corresponding algorithmic interpretation of the reflectivity values. An example technique that processor 12 may implement to discriminate between different types of weather using a Vertically Integrated Reflectivity (VIR) calculation is described in U.S. Pat. No. 8,068,050 to Christianson et al., which issued on Nov. 29, 2011 and is entitled, "METHODS AND SYSTEMS FOR DETECTION OF HAZARD TO AVIATION DUE TO CONVECTIVE WEATHER," the entire content of which is hereby incorporated by reference. VIR data includes the sum of reflectivity values stored in a column of cells in the three-dimensional buffer or an integration of the values in the column of cells is performed. Processor 12 may vertically integrate the product of reflectivity values and altitude, each raised to some power.

User interface 18 is configured to present weather information (e.g., a vertical profile display including a hazard band indication) to a user, who may be a pilot of the aircraft, another flight crew member, or may be located remotely from the aircraft, such as at a ground control station. User interface 18 includes display device 20, which can be, for example, one or more of a liquid crystal display (LCD) or a light emitting diode (LED) display configured to present visual information to the user. Display device 20 can be provided by any suitable device, such as, for example, one or more of a tablet computing device, an electronic flight bag (EFB), a primary flight display (PFD), a multifunction display (MFD), a navigation display, or any other suitable display. Display device 20 can be a head-up display, a head-down display, or a head-mounted display.

In addition, in some examples, user interface 18 includes a speaker configured to deliver audible information, a sensory device configured to deliver information via a somatosensory alert, or any combination thereof User interface 18 is configured to receive input from a user. For example, user interface 18 can include one or more of a keypad, buttons, a peripheral pointing device or another input mechanism that allows the user to provide input. The buttons may be dedicated to performing a certain function, e.g., receiving user input indicative of a specific type of input, or the buttons and the keypad may be soft keys that change in function depending upon the section of a display currently viewed by the user. In some examples, the display device of user interface 18 may be a touch screen display configured to receive the input from a user.

As discussed below with reference to FIGS. 2-5, processor 12 is configured to generate and present, via display device 20, a vertical profile display that illustrates a hazard band indication that indicates the vertical (as measured in a direction away from the ground) extent of hazardous weather detected based on weather information from radar system 14 and/or weather from one or more sources external to aircraft 10 (e.g., from other aircraft, a ground station, ground weather systems, or any combination thereof). The hazard band indication includes an upper limit line displayed at an altitude above which there is no hazardous weather and, in some examples, includes a lower limit line that indicates the altitude below which there is no hazardous weather. In some examples, the vertical profile display may further include additional information regarding the upper and lower limit lines, such as a textual altitude indication that indicates an altitude of one or more limit lines.

In addition, in some examples, the vertical profile display includes one or more weather icons that indicate a weather condition for a particular volume of space. The hazard band indication may be displayed alone in some examples, and in combination with the weather icons in other examples. Processor 12 may select the one or more weather icons for the display based on the type of detected weather. For example, processor 12 may select a type of weather icon based on the radar reflectivity values associated with the volume of space for which the weather icon is being generated. A weather icon includes visible indicia associated with a particular type of weather condition. For example, the weather icon can include one or more graphical attributes (e.g., color coding, line weight, cross-hatching, shading, or the like) that indicates the type of weather indicated by the weather icon. In some examples, processor 12 generates the vertical profile display to include the one or more weather icons at the altitudes at which the weather associated with the weather icon was detected. In this way, in some examples, a vertical profile display may include one or more weather icons, each weather icon indicating a distinct hazardous weather condition for a respective volume of space, and each weather icon being displayed at an altitude that is the same altitude as the respective distinct hazardous weather condition.

In some examples, a vertical profile display may illustrate detected weather as a plurality of weather blocks. Each weather block indicates the weather in a volume of space associated with the block. In some examples, the weather blocks each have the same height and width. In other examples, the weather blocks may have varying heights and widths, which may provide better granularity of the weather information. In this example, at least some of the weather blocks may have the same heights and widths.

Each weather block may include one or more graphical indicium (e.g., color coding, cross-hatching, line weights, shading, or the like) that indicates the severity of the weather in a volume of space represented by the weather block. In some examples, processor 12 selects a color for each weather block based on the radar reflectivity values associated with the volume of space represented by the weather block. Processor 12 may, for example, retrieve the weather reflectivity values for the volume of space from the 3D memory buffer. The color of the weather block may indicate the strength of the radar returns. In this way, the plurality of weather blocks may be visually distinct from one another based on the severity of the weather information for the volume of space represented by the weather block. Any suitable coloring convention may be used. In one example, processor 12 may select blue or green for volumes of space from which radar system 14 received relatively weak radar returns, and red or magenta for volumes of space from which radar system 14 received with relatively very strong radar returns. Other coloring conventions may be used.

In addition, or instead, the pattern of the weather blocks may indicate the severity of the weather in the volumes of space associated with the volume blocks. For instance, for a weather block representing relatively heavy precipitation, processor 12 may generate the block to have a pattern of dots spaced very closely together, and for a weather block representing light precipitation, processor 12 may generate the block to have a pattern with dots spaced far apart. In other examples, other graphical indicia may be used to indicate the different severities of weather.

In some examples in which a vertical profile display generated by processor 12 includes both weather blocks and one more weather icons, the weather icons may be associated with a specific weather block, such that the weather icon indicates the type of weather detected within the volume of space represented by the weather block. In some examples, processor 12 may display the weather icon in an associated weather block, next to an associated weather block, or in another manner that indicates the association between the weather icons and weather blocks.

In some examples, as described in further detail below, the vertical profile display includes a vertical profile view of an expected flight path for an aircraft and includes indications of primary weather and secondary weather, where the indication of primary weather is visually distinct from the indication of secondary weather.

In addition, in some examples, the vertical profile display includes a graphical indication of radar attenuation that represent where radar attenuation may have caused the receiver 24 gain to reach its maximum value, so further calibration of returns is not possible. An example of a graphical indication of radar attenuation includes arcs (also referred to herein as "REACT arcs"). Processor 14 can implement any suitable technique to determine areas of radar attenuation, such as, but not limited to, the Rain Echo Attenuation Compensation Technique (REACT).

Any combination of the features of the vertical profile display discussed above may be used with the hazard band indications. System 10 is only one example of a system configured to generate and present a vertical profile display including hazard band indications. Other systems including a different configuration of components can also be used to generate the vertical profile displays disclosed herein.

Figure 2:
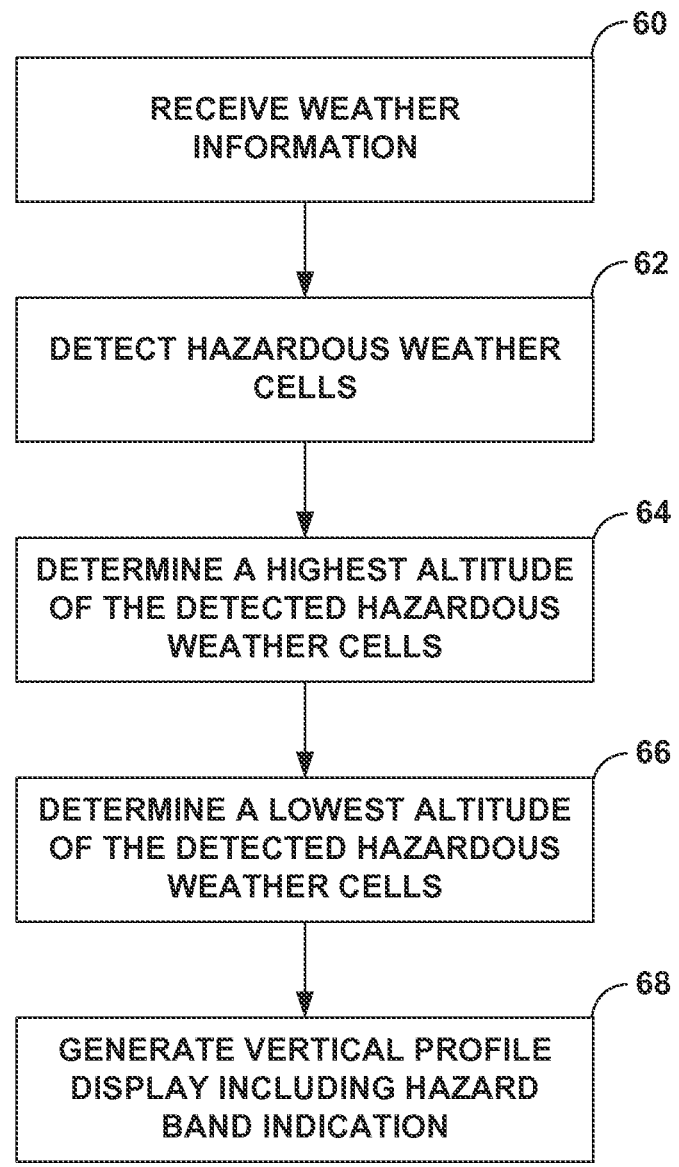
FIG. 2 is a flow diagram illustrating an example technique for generating a vertical profile display that includes a hazard band indication, in accordance with one or more aspects of the present disclosure.

FIG. 2 is a flow diagram illustrating an example technique for generating a vertical profile display that includes a hazard band indication. While the technique is described as being perforated by processor 12 (FIG. 1), in other examples, the technique shown in FIG. 2, as well as FIG. 4 and the other techniques described herein, may be performed by another processor (e.g., a processor of a ground station), alone or in combination with processor 12. FIG. 2 is described with reference to FIG. 3A, which illustrates an example vertical profile display 40 that includes a hazard band indication. In some examples, processor 12 may generate vertical profile display 40 using the example technique shown in FIGS. 2 and 4.

Figure 3A:
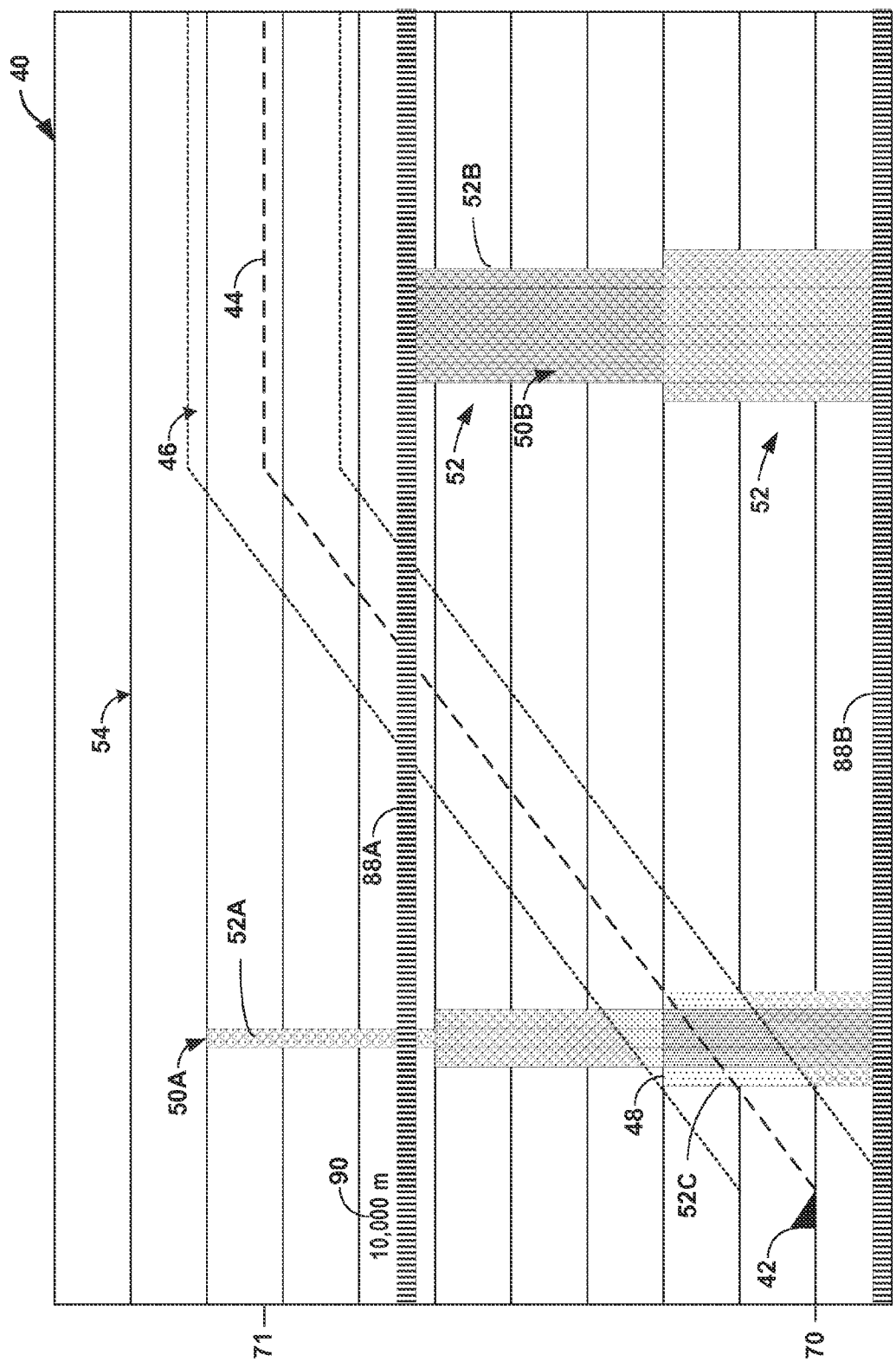
FIGS. 3A and 3B are example vertical profile displays that present weather radar information for an aircraft, in accordance with one or more aspects of the present disclosure.

As shown in FIG. 3A, vertical profile display 40 depicts a vertical profile view of an airspace. The horizontal cross-section that is depicted by vertical profile display 40 can be any suitable magnitude, such as, but not limited to, 300 nautical miles to 400 nautical miles. Vertical profile display 40 includes a graphical indication of the ownship 42, a graphical indication of a flight path 44, a graphical indication of an altitude band 46, weather indications 48, 50A, and 50B, and a plurality of weather blocks 52. Weather blocks 52 include weather blocks 52A, 52B, and 52C. In addition, display 40 includes altitude reference lines 54, and may, in some examples, also include one or more of horizontal distance lines, a terrain depiction, graphical indications of other aircraft, and the like. Vertical profile display 40 may further include a hazard band indication that includes limit lines 88A and 88B.

Processor 12 may receive information from other various components, such as radar system 14 and aircraft systems 30, as described above with regards to FIG. 1, in order to determine and generate weather blocks 52 and weather indications 48, 50A, and 50B. Weather indications 48, 50A, and 50B are described in further detail below with respect to FIG. 4.

In accordance with the technique shown in FIG. 2, processor 12 receives weather information from radar system 14, from weather sources external to aircraft 10, such as from a ground station, other aircraft, a satellite, or a ground-based weather system, or any combination thereof (60). The received weather information may include weather for a plurality of voxels of space. Each voxel represents a volume of space, and can have any suitable dimensions. In some examples, the voxels can have the same size and can be arranged in a three-dimensional grid. In some examples, the size of the voxels may vary based on the distance from aircraft to the volume of space being represented to match the native resolution of the radar. For example, volumes of space closer to the aircraft may appear as smaller voxels and further volumes may appear as larger voxels.

In some examples, processor 12 defines the position of the voxels based on geographic coordinate system. In other examples, processor 12 defines the position of the voxels relative to each other. In some examples, processor 12 selects the voxels in one or more vertical planes of the 3D volumetric memory buffer based on a flight path of the aircraft in order to generate weather information in a vertical slice relevant to the flight path of the aircraft. If, for example, vertical profile display 40 displays a vertical profile view of an unwound flight path, the voxels may be in more than one plane. In the unwound flight path display, flight path 44 may represent, for example, different legs of a flight path (e.g., extending in different directions). In addition, in some examples, processor 12 identifies the voxels within a particular altitude range of the current position of the aircraft for which the weather information is being displayed, or displays the voxels from a particular altitude to the ground.

Processor 12 detects hazardous weather cells based on the received weather information (62). Some weather cells, such as air turbulence, windshears, microbursts, volcanic ash, storms, rain, snow, hail, low-visibility areas, or high-altitude ice crystals, may be referred to as "hazardous weather" because of its relative severity and its impact on air travel. Processor 12 can determine, based on the received weather information, information regarding the hazardous weather cells, such as the location, the severity, the type of weather, and the vertical extent of the detected hazardous weather cells. For example, processor 12 may determine weather associated with each of the voxels determined above and group the voxels together based on the radar reflectivity values to define weather cells. Voxels within a predetermined range of each other and having radar reflectivity values indicative of hazardous weather may be grouped together to define hazardous weather cells. In this way, the location of the voxels associated with radar reflectivity values indicating hazardous weather, the number of these voxels grouped together, and other aspects of the voxels may indicate the location of hazardous weather cells and the vertical extent of the hazardous weather cells. The weather associated with each voxel may represent the average value of reflectivity in the volume of space represented by the voxel.

In the example shown in FIG. 3A, the weather is as a plurality of weather blocks 52. Processor 12 may select the weather information stored by memory 16 corresponding to the volume of space represented by the voxels in order to generate weather blocks. In some examples, in order to show weather that may be useful for providing situational awareness for the flight crew of the aircraft, processor 12 may select the voxels associated with radar reflectivity values above a predetermined threshold value (which may be stored by memory 16) and generate the weather blocks based on the selected voxels. As shown in vertical profile display 40 of FIG. 3, some voxels may not be associated with any weather due to, e.g., the low radar reflectivity values.

In some examples, weather blocks 52 may each have a set width of a number of voxels and a set height of a number of voxels. In other examples, weather blocks 52 may have a set width of a number of voxels, but varying heights. In yet other examples, weather blocks 52 may have a set height of a number of voxels, but varying widths. In addition, in other examples, at least two weather blocks 52 may have different heights, widths, or both heights and widths. Weather blocks 52 can have any suitable configuration, and may be, for example, rectangles, as shown in FIG. 3, squares, other parallelograms, or the like.

In some examples, processor 12 generates a separate weather block for each voxel. In other example, processor 12 generates a weather block 52 based on a plurality of adjacent voxels, which may include voxels adjacent to each other in the vertical (altitude) direction, the horizontal direction, or both. Processor 12 may, in some examples, group adjacent voxels together to define a common weather block if the voxels have radar reflectivity values (e.g., an average for the voxel) within a predetermined range of each other, thereby indicating substantially the same weather was detected in the volumes of space associated with the voxels. In display 40 shown in FIG. 3, weather blocks 52A and 52C have the same height (measured in the vertical direction) and width (measured substantially perpendicular to height), and weather block 52B has a different height and width than weather blocks 52A, 52C.

In some examples, processor 12 generates vertical profile display 40 including weather blocks 52, wherein weather blocks 52 are constructed out of the voxels associated with weather and wherein weather blocks 52 indicate the weather attributes associated with the volumes of space represented by the one or more voxels. Processor 12 can present the display 40 via display device 20 of user interface 18. Processor 12 determines the attributes for each weather block based on the weather associated with the voxels defining the block. For example, processor 12 may select a color, pattern, or other graphical indicia for a weather block based on the radar reflectivity values for the one or more voxels defining the weather block. Memory 16 can store instructions for the color coding or other code used for the weather block. For example, memory 16 may store a data structure that associates a plurality of radar reflectivity value ranges with respective graphical indicia, and processor 12 may reference the data structure in order to generate the weather blocks.

In examples in which processor 12 generates a weather block 52 based on a plurality of adjacent voxels, if the voxels are associated with weather of varying severity, then processor 12 may select the attributes of the weather block to indicate the most severe weather indicated by the voxels.

In the example shown in FIG. 3A, weather block 52A has a different pattern than weather block 52B to indicate that the volume of space associated with (and represented by) weather block 52A has less severe weather than the volume of space associated with weather block 52B. In particular, block 52A has a less dense pattern of dots than block 52B. Other graphical indicia can be used in other examples. For example, processor 12 may generate weather block 52A having a green color and weather block 52B having a red color; other coloring conventions may be used in other examples.

As shown in FIG. 3A, weather blocks 52 indicate both the vertical and horizontal extent of detected weather and present weather information in a manner that permits a user to quickly and easily ascertain the approximate boundaries between different weather conditions (e.g., severities). Parallelogram-shaped blocks 52 may be useful for displaying the approximate boundaries and/or severities between different weather conditions.

Processor 12 determines a first attitude based on the hazardous weather cells, with the first altitude being a highest altitude of the detected hazardous weather cells within at least the flight path 44 of aircraft 10 (64). The highest altitude represents the top of the vertical extent of the detected hazardous weather cells. In some examples, processor 12 determines the first altitude based on only hazardous weather cells that intersect with flight path 44 of aircraft 10 or are within a predetermined distance range of the expected flight path 44. Processor 12 can determine flight path 44 based on information from aircraft systems 30 (FIG. 1), such as a FMS. In other examples, processor 12 determines the first altitude based on all hazardous weather cells detected based on the received weather information, where the hazardous weather cells may not intersect with flight path 44 of aircraft 10. In some examples, processor 12 may also determine a lowest altitude of the detected hazardous weather cells to be used to determine the position of lower limit line 88B (66).

A graphical depiction of flight path 44 in display 40 may tallow a user to quickly ascertain, from display 40, whether hazardous weather cells are in the direct line of the flight path. In some examples, processor 12 generates the graphical depiction of flight path 44 in a way that visually distinguishes certain portions of flight path 44 based on the weather with which flight path 44 intersections. For instance, if a portion of flight path 44 intersects with a hazardous weather cell (e.g., a weather block indicating hazardous weather), that portion of the flight path 44 may be visually distinct from the remainder of the flight path that is not intersecting a hazardous weather cell, using characteristics such as color, line weight, or line dashes to distinguish the two portions of the flight path. Doing so may further allow the user to quickly compare flight path 44 to see whether it will intersect with hazardous weather cells and, if so, which parts of flight path 44 should be modified to avoid the hazardous weather.

Processor 12 generates vertical profile display 40 including a hazard band indication based on the determined highest altitude of the detected hazardous weather cells (68). For example, in the example shown in FIG. 3A, processor 12 generates vertical profile display 40 including upper limit line 88A positioned within display 40 at a second altitude greater than or equal to the first altitude. Vertical profile display 40 that provides upper limit line 88A may provide a relatively simple visual indication of hazardous weather cells, from which a pilot may relatively quickly ascertain the altitude of hazardous weather cells. In some cases, it may not be advisable to fly below a hazardous weather cell. Therefore, it may be beneficial for a pilot to have a simple indication that shows a pilot an altitude at which aircraft 10 must be flown well over in order to avoid flying into or under a hazardous weather cell.

By placing upper limit line 88A at a second altitude greater than or equal to the first altitude determined in step 64, upper limit line 88A will be placed at or above the highest altitude of the detected hazardous weather cells. This may allow a pilot to relatively quickly determine, based on vertical profile display 40, an altitude above which there will be no weather hazards, e.g., convective cells, which may allow the pilot to formulate a flight strategy that takes into consideration the vertical extent of detected weather cells. Hazards from convective weather cells may propagate well beyond the horizontal and vertical dimensions of a cell. Upper limit line 88A, alone or in combination with lower limit line 88B, may also provide a pilot with a vertical "keep-out" area, or a range of altitudes at which flight should be avoided, if possible.

In some examples, processor 12 displays upper limit line 88A, which defines the upper bound of the hazard band indication, at the first altitude, such that the second altitude is equal to the first altitude. In other examples, processor 12 displays upper limit line 88A above the first altitude, which may help ensure that upper limit line 88A bounds the detected hazardous weather cells, e.g., by providing a buffer that may that may help account for any potential inaccuracies in the hazardous weather detection. In addition, displaying upper limit line 88A above the first altitude may be useful for situations in which it may not be advisable to fly directly above a hazardous weather cell (e.g., due to potentially unstable air). Upper limit line 88A may provide a simple indication of an altitude above which there is no hazardous weather, so that the pilot may fly aircraft 12 above that indicated altitude.

In some examples, system 10 may be configured such that a user may select the vertical margin between the second altitude and the first altitude. In this way, the user may select the vertical margin, or amount of buffer, between the detected hazardous weather and upper limit line 88A and the highest altitude of detected hazardous weather. In response to receiving user input, via user interface 18, indicating the vertical margin, processor 12 may generate and display upper limit line 88A at a second altitude that is greater than the first altitude by the selected vertical margin.

In a weather radar display that presents radar reflectivity information by color (indicative of the strength of the radar returns), even in a vertical profile display, it may be difficult to determine the vertical extent of the hazardous weather cell. For example, the border between the relatively hazardous weather cells and the relatively non-hazardous weather may be unclear due to the irregular nature of the border. In contrast, vertical profile display 40 including upper limit line 88A may depict hazardous weather information in a manner that may enable a pilot to relatively quickly ascertain the vertical extent of hazardous weather. Upper limit line 88A may eliminate the need for a pilot (or other user) to first determine the hazardous weather cells and then filter through the hazardous weather to determine the relevant weather and altitudes. Upper limit line 88A blocks off airspace based on an upper limit of detected hazardous weather cells and the ground, thereby enabling the pilot to easily determine how to deviate around the hazardous weather cells and any downdrafts below the hazardous weather cell.

In some examples, such as the example shown in FIG. 3A, upper limit line 88A extends horizontally across the entirety of vertical profile display 40. However, in other examples, upper limit line 88A may extend horizontally across only a portion of vertical profile display 40. For instance, in some examples, upper limit line 88A may extend horizontally across a portion of vertical profile display 40, such as the portion associated with the location of the one or more detected hazardous weather cells. In other examples, upper limit line 88A may only extend horizontally to a location on vertical profile display 40 at which a pilot must begin an ascent to navigate safely above the hazardous weather cell.

In some examples, the hazard band indication provided by vertical profile display 40 also includes lower limit line 88B that indicates an altitude below which there is no hazardous weather. Processor 12 may determine a third altitude below which there is no hazardous weather, and generate and display a lower limit line 88B at a fourth altitude that is less than or equal to the third altitude. Lower limit line 88B may represent a lower bound of the vertical extent of the detected one or more hazardous weather cells. Such an indication may be useful in some cases, e.g., when aircraft 10 may not be able to fly above a hazardous weather cell or when aircraft 10 is landing. Such an indication can be provided by lower limit line 88B.

In some examples, such as the example of FIG. 3, lower limit line 88B may be at ground level, having an altitude of 0 meters. However, in other examples, lower limit line 88B may be at another altitude below which there are no hazardous weather cells, such as at or near the bottom of a hazardous weather cell. In some examples, such as the example of FIG. 3A, lower limit line 88B extends horizontally across the entirety of vertical profile display 40. However, in other examples, lower limit line 88B may extend horizontally across only a portion of vertical profile display 40, as described above with respect to upper limit line 88A.

In combination, hazard band indications 88A and 88B may define a hazard block, which indicates a range of altitudes for which flight should be avoided, as hazardous weather cells are located within that range. In some examples, vertical profile display 40 may further include a textual altitude indication 90 which may disclose the altitude of the one or more limit lines. In the example of FIG. 3A, textual altitude indication 90 indicates the altitude of upper limit line 88A. The text can be located adjacent to the respective limit line 88A, 88B, or within the band itself In some examples, processor 12 generates limit lines 88A and 88B to have a particular graphical attribute (e.g., color coding, line weight, pattern, shading, or the like) that is indicative of the severity or type the hazardous weather bounded by the bands 88A, 88B.

In the example shown in FIG. 3, vertical profile display 40 also includes indications of primary and secondary weather. In other examples, display 40 does not include the indications of primary and secondary weather. Displaying upper limit lines 88A, 88B with the indications of primary and secondary weather may help indicate whether limit lines 88A, 88B indicate hazardous weather associated with primary weather Of secondary weather.

Processor 12 may receive information regarding flight path 44 of aircraft 10. Processor 12 may receive the information regarding flight path 44 from aircraft systems 30 of the aircraft, from ground control (e.g., an air traffic controller), via sources outside of the aircraft (e.g., via any suitable datalink), or from memory 16. Flight path 44 is the trajectory the aircraft is expected to take (e.g., intends to take) through space as a function of time and/or distance, and can be defined by a flight plan of the aircraft, pilot instructions, ground control instructions, other sources, or any combination thereof. In some examples, processor 12 infers flight path 44 from the present altitude, vertical speed, and/or ground speed of the aircraft, as indicated by data sources of aircraft systems 30.

Processor 12 may determine altitude band 46 around flight path 44. The altitude band 46 may be a range of altitudes that includes flight path 44 (defined between a bottom altitude and a bottom altitude). Band 46 defines a corridor (or envelope) in the vicinity of the flight path 44, and may extend above and below flight path 44. In some examples, at each point along flight path 44, altitude band 46 can be centered at the altitude of flight path 44. In other examples, band 46 is not centered with respect to flight path 44, but, instead, may include a greater altitude range above or below flight path 44.

The magnitude of band 46 to be inclusive of weather that may be relevant to the flight of the aircraft. For instance, altitude band 46 may define a range of altitudes in which hazardous weather may affect the flight of the aircraft. In some examples, the magnitude of altitude band 46 may be predetermined and stored by memory 16. In other examples, processor 12 may dynamically determine the magnitude of altitude band 46 based on one or more factors, such as, but not limited to, the type of aircraft for which the weather display is being generated, the current weather conditions, and the like. In some examples, altitude band 46 has a magnitude of 2500 meters (or about 8,000 feet) and includes extends approximately 1,250 meters (or about 4,000 feet) above flight path 44 and approximately 1,250 meters (or about 4,000 feet) below flight path 44. In other examples, such as when the aircraft is either taking off or landing, altitude band 46 may have a magnitude of 3000 meters (or about 10,000 feet) and extend approximately 3,000 meters above ground level. In still other examples, such as when the aircraft is cruising at high altitudes, the band may have a fixed bottom altitude of approximately 7,500 meters (or about 25,000 feet). Other magnitudes and positions relative to flight path 44 can also be used in other examples.

Altitude band 46 may have a uniform magnitude in some examples. In other examples, altitude band 46 may have a varying magnitude (between the top and bottom altitudes). For example, attitude band 46 may expand at certain attitudes, at certain flight path angles, or both. Although vertical profile display 40 shown in FIG. 3 illustrates graphical indications of flight path 44 and altitude band 46, in other examples, display 40 may not include one or both of these graphical indications.

Processor 12 may receive weather information from radar system 14. Processor 12 may generate a vertical profile display 40 including indications 48, 50A, 50B of primary and secondary weather based on the weather information and the altitude band 46. Processor 12 can present the display 40 via display device 20 of user interface 18. In some examples, processor 12 periodically updates the weather information indicated by display 40 based on an updated flight path 44, updated radar reflectivity values, or both.

As shown in FIG. 3, vertical profile display 40 may comprise a graphical indication of flight path 44 and altitude band 46. In the example shown in FIG. 3, the graphical indication of flight path 44 includes a dashed line that follows the expected trajectory of the aircraft over time, starting from the current position of the aircraft 42. Flight path 44 illustrated in FIG. 3 includes an altitude climb from a first altitude 70 to a second altitude 71 over time. The graphical indication of altitude band 46 includes a first line above flight path 44 and a second line below flight path 44. Flight path 44 may be equidistant from the first and second lines.

Vertical profile display 40 may comprise an indication of primary weather 48 and indications of secondary weather 50A, 50B. Processor 12 determines primary weather 48 based on weather information from the volume of space within altitude band 46 and determines secondary weather 50A, 50B based on weather information from the volume of space outside of altitude band 46. For example, processor 12 may compare the location of each voxel of a plurality of voxels to the location of flight path 44 and altitude band 46 to determine whether the weather associated with each particular voxel is primary weather (as indicated by weather indication 48) or secondary weather (as indicated by weather indications 50A and 50B).

In vertical profile display 40, indications of secondary weather 50A, 50B are visually distinct from the indication of primary weather 48. As a result, a user may view display 40 and relatively quickly differentiate between primary weather and secondary weather. In addition, the display of flight path 44 in conjunction with primary weather 48 may help a pilot determine whether the weather along flight path 44 will make it necessary to divert from the planned route.

Processor 12 may generate the indications of secondary weather 50A, 50B to be visually distinct from the indication of primary weather 48 using any suitable technique. In some examples, the indications of secondary weather 50A, 50B may be visually distinct from the indication of primary weather 48 by the inclusion of a crosshatch pattern. As shown in FIG. 3, processor 12 included a crosshatch pattern over the portion of weather blocks 52 outside of altitude band 46 to show the secondary weather.

In other examples, the indications of secondary weather 50A, 50B may be visually distinct from the indication of primary weather 12 by the inclusion of a striped pattern over the portion of weather blocks 52 outside of attitude band 46. Other visual distinctions could be provided by different colors for the portions of weather blocks 52 inside altitude band 46 (primary weather) and outside of altitude band 46 (secondary weather), different intensities of color (e.g., muted colors for secondary weather), varying clarity (e.g., blurring the portions of weather blocks 52 outside altitude band 46 to indicate secondary weather 50A, 50B), the inclusion of other patterns over the portions of weather blocks 52 outside weather band 46 to provide indications of secondary weather 50A, 50B, the inclusion of other patterns over the portions of weather blocks 52 inside weather band 46 to provide indications of primary weather 48, or any combination of the above techniques.

In the example of FIG. 3, a single block 52 may represent both primary weather and secondary weather, e.g., due to the way in which flight path 44 extends through weather blocks 52. In other examples, processor 12 may generate weather blocks 52 such that a single weather block only represents one of primary weather or secondary weather.

Vertical profile display 40 can represent any suitable view type of a plurality of different view types that have different horizontal and/or vertical bounds. Examples of view types include, but not limited to, a representation of a current aircraft track, a representation of a user-selected azimuth, or an unwound aircraft flight path inferred by processor 12 from a flight management system when the aircraft is in lateral navigation mode. Thus, flight path 44 may represent a "flattened" version of the expected flight path of the aircraft and may not be a true vertical slice of the flight path in some cases. However, the displayed flight path 44 can be a true vertical slice in other cases.

In some examples, processor 12 receives, via user interface 18, user input that indicates a vertical profile display type and processor 12 may generate the vertical profile display based on the user selected display type.

Figure 3B:
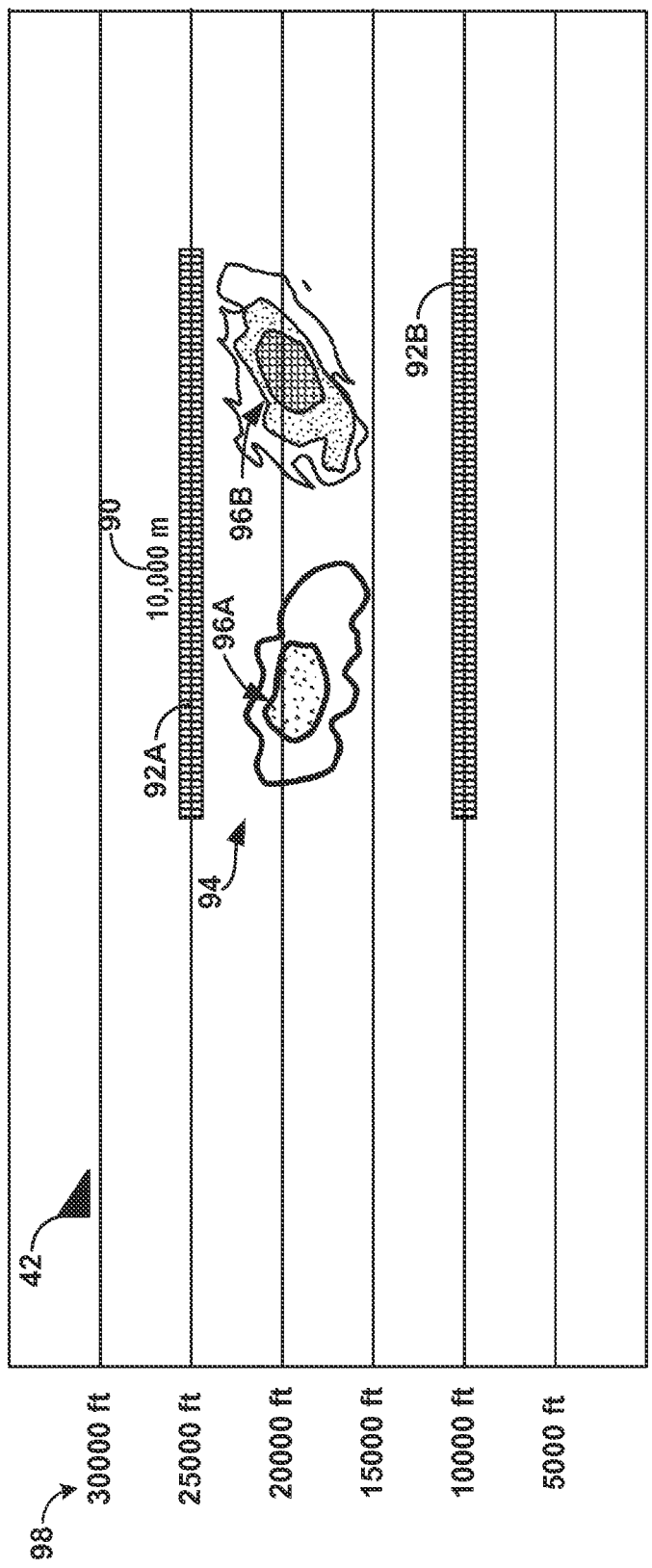

Although vertical profile display 40 shown in FIG. 3A includes both weather blocks 52 and indications of primary and secondary weather 48, 50A, 50B, in other examples, a vertical profile display 40 including a hazard band indication may display weather information in another manner. FIG. 3B illustrates another example vertical profile display 41, which includes a hazard band indication (and, in particular, limit lines 92A, 92B) displayed in conjunction with radar reflectivity information 94. Processor 12 generates the radar reflectivity information shown in display 41 by at least selecting a color of a displayed voxel based on the radar reflectivity values associated with the voxel. FIG. 3B illustrates a different configuration of limit lines 92A, 92B than FIG. 3A. For example, in contrast to limit lines 88A, 88B (FIG. 3A), limit lines 92A, 92B do not extend across the entire horizontal extent of vertical profile display 41, but, rather, only across the region in which the hazardous weather cells 96A, 96B were detected. The length (measured in the horizontal direction, perpendicular to the direction in which altitude is shown in vertical profile display 41) of limit lines 92A, 92B may vary in different examples. For example, a user may provide input, via user interface 18, indicating a length of each of the displayed limit lines 92A, 92B and, in response to receiving the user input, processor 12 may generate limit lines 92A, 92B to have the selected horizontal extent. Limit lines 92A, 92B may, but need not, have the same lengths.

In yet another example, processor 12 may automatically adjust the length of limit lines 92A, 92B based on one or more variables, such as a quality of the weather information, a severity of the weather information, a speed of an aircraft, a current altitude, a number of hazards in a vicinity of the aircraft, a size of the aircraft, a size of the weather information, or any combination of the above variables, among other things. For instance, processor 12 may generate relatively long limit lines 92A and 92B if the quality of the weather information is relatively low, if the severity of the weather information is relatively high, if the aircraft is traveling faster than a particular speed threshold, if the current altitude is within a particular threshold altitude of the altitude of the limit line, if there are a relatively large amount of hazards (e.g., at least a threshold number of hazardous weather cells) in the vicinity of aircraft 10, if aircraft 10 is relatively large, or any combination thereof. For example, processor 12 may be configured to generate limit lines having predetermined lengths, and processor 12 may select from the predetermined lengths based on one or more of the factors discussed above.

In vertical profile display 41, lower limit line 92B is not displayed at the ground, but, rather, at an altitude above ground. As discussed above, processor 12 can display lower limit line 92B at an altitude that is selected to be a predetermined distance (e.g., stored by memory 16) below the lowest vertical extent of detected hazardous weather cells 96A, 96B.

Vertical profile display 41 also differs from vertical profile display 40 (FIG. 3A) in that display 41 includes a plurality altitude indications 98 along the vertical axis of the display. Altitude indications 98 may provide the altitude of different portions of the display, as opposed to altitude indication 90, which indicates the altitude of a particular upper limit line 92A. In addition, in some examples, displays 40, 41 may also include horizontal distance indications along the horizontal axis of the vertical profile displays.

Figure 4:
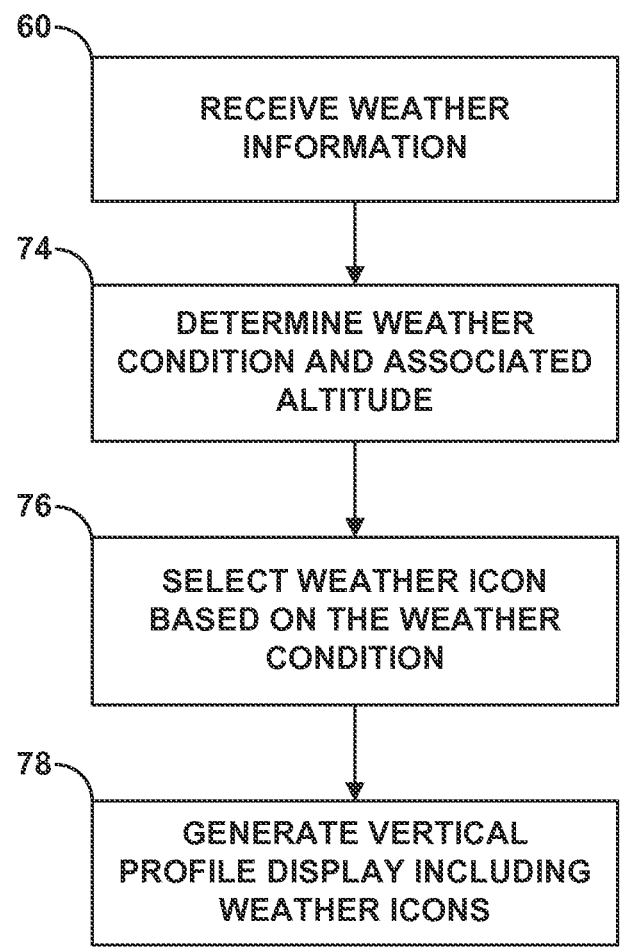
FIG. 4 is a flow diagram illustrating an example technique for generating a vertical profile display that includes one or more weather icons, in accordance with one or more aspects of the present disclosure.
Figure 5:
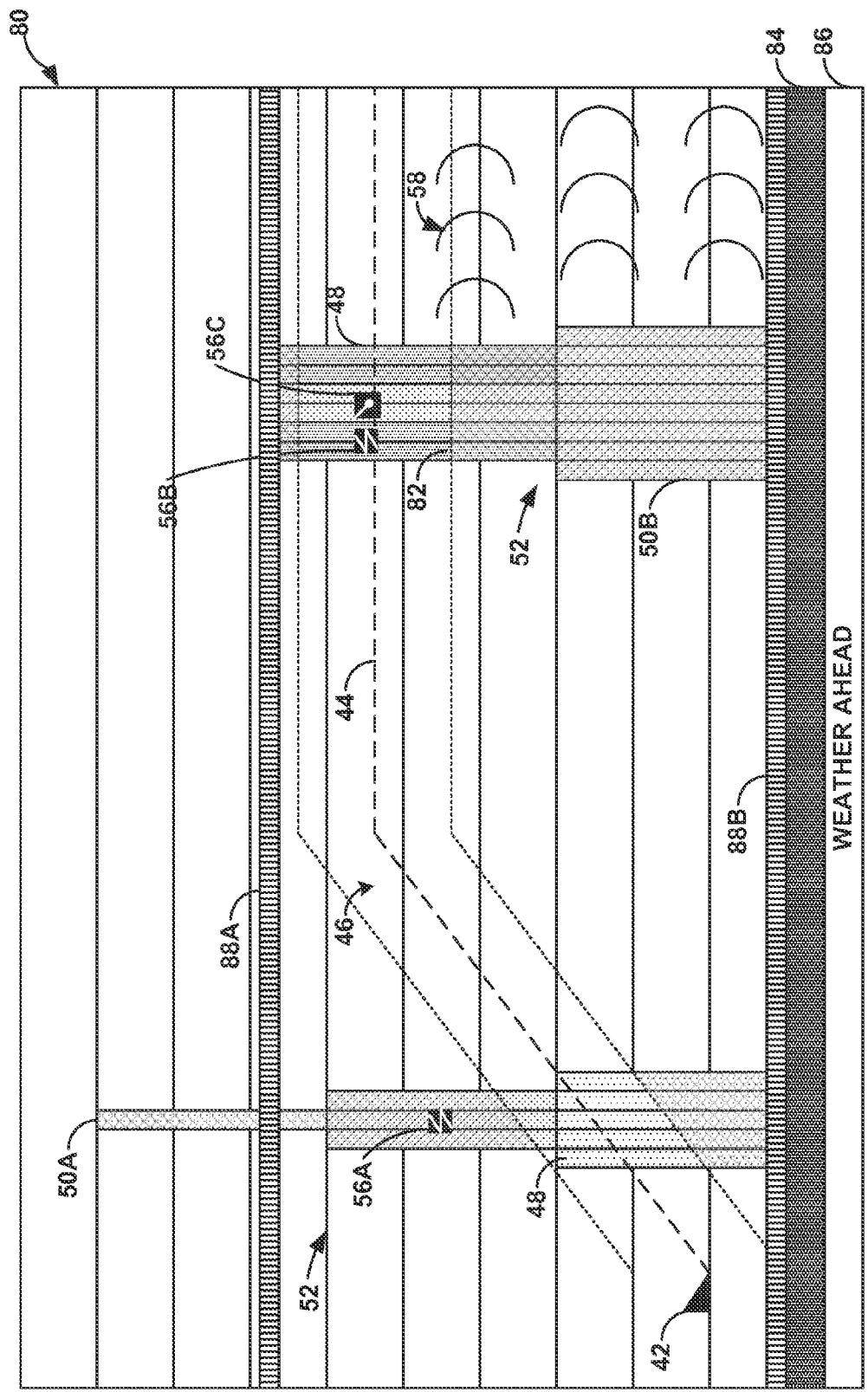
FIG. 5 is an example vertical profile display that includes weather radar information for an aircraft, hazard band indications, weather icons, and an additional weather alert, in accordance with one or more aspects of the present disclosure.

In some examples, a vertical profile display, such as vertical profile display 80 of FIG. 5, may also include additional features, such as one or more of weather icons, weather alerts, or attenuation indications (which may be arcs or vertical lines). FIG. 4 is a flow diagram illustrating an example technique for generating a vertical profile display, such as vertical profile display 80 of FIG. 5 that includes weather icons, in accordance with one or more aspects of the present disclosure. FIG. 5 illustrates an example vertical profile display 80 that displays weather radar information for an aircraft, weather icons, attenuation arcs, and an additional weather alert, in accordance with one or more aspects of the present disclosure. Processor 12 may generate vertical profile display 80 using the techniques described with respect to FIGS. 2 and 4. As with vertical profile display 40 (FIG. 3A), vertical profile display 80 includes an indication of the aircraft 42, an indication of the flight path 44, an indication of an altitude band 46, an indication of primary weather indication 48, indications of secondary weather 50A, 50B, and a plurality of weather blocks 52. However, as with display 40, in other examples, display 80 may not include one or more of graphical indications of the aircraft 42, the flight path 44, the altitude band 46, primary weather 48, or secondary weather 50A, 50B. Vertical profile display 80 also includes weather icons 56A-56C, attenuation arcs 58, weather alerts 84 and 86, and a hazard band indication including limit lines 88A and 88B.

Weather icons 56A-56C each represents a type of weather associated with a particular volume of space, which, in the example shown in FIG. 5, is defined by a weather block. Weather icons 56A-56C each includes one or more graphical indicium that enables the weather icon to be displayed in a visually distinct manner, e.g., relative to other weather icons and other portions of vertical profile display 80.

In accordance with the technique shown in FIG. 4, processor 12 receives weather information (60), e.g., as described with respect to FIG. 3. Processor 12 determines a weather condition and an associated altitude for any weather cells in the received weather information (74). In the example of FIG. 4, processor 12 determines primary weather includes hazardous weather 82. For example, processor 12 may determine whether the radar reflectivity values indicate air turbulence, windshears, microbursts, volcanic ash, storms, rain, snow, hail, low-visibility areas, high-altitude ice crystals, or the like. Each type of hazardous weather target may be associated with a particular radar reflectivity value or range of values, or a characteristic pattern for radar reflection. Thus, in some examples, processor 12 may identify hazardous weather 82 by comparing received radar reflectivity values (e.g., signal strengths) to predetermined radar reflectivity values or range of values, or to predetermined characteristics of radar reflection.

Processor 12 selects a weather icon based on the weather condition (76). For example, memory 16 (FIG. 1) of aircraft 10 may store a plurality of different weather icons, each icon being associated with a respective type of weather condition or a range of radar reflectivity values, and processor 12 may select the weather icon from memory 12 based on the determined type of weather or determined radar reflectivity value. In some examples, processor 12 generates display 80 to include weather icons for only detected hazardous weather. In other examples, processor 12 generates display 80 to include weather icons for all detected weather.

In the example of FIG. 5, processor 12 determines that the weather condition for the volume of space associated with weather icon 56A is lightning, that the weather condition for the volume of space associated with weather icon 56B is also lightning, and that the weather condition for the volume of space associated with weather icon 56C is hail. Based on the determined weather conditions, processor 12 generates vertical profile display 80 including the weather icons 56A-56C, each weather icon indicating a weather condition for a volume of space and each weather icon being positioned at a particular altitude at which the weather indicated by the weather icon was detected (78). In the example of FIG. 5, weather icons 56A-56C have similar configurations, e.g., boxes, but differ from each other based on the graphical shapes of the icons, the shapes indicating what type of hazardous weather is present. However, in other examples, weather icons 56A-56C may be displayed with other visual characteristics. For instance, weather icons 56A-56C may be shaped in a way that the shape represents the type of hazardous weather present. For example, if a lightning storm is detected, vertical profile display 80 may display a weather icon shaped like a thunder bolt in the area of the hazardous weather cell. In another example, if an area of high wind is detected, then vertical profile display 80 may display a weather icon shaped like a gust of wind. In the example of FIG. 5, vertical profile display 80 displays the weather icons associated with lightning 56A and 56B in the respective weather blocks representing the volumes of space in which the lightning was detected. Vertical profile display 80 further displays the weather icon associated with hail 56C in the respective weather block representing the volume of space in which hail was detected. In other examples, weather icons can represent air turbulence, windshears, microbursts, volcanic ash, storms, rain, snow, low-visibility areas, high-altitude ice crystals, or the like.

In some examples, processor 12 determines the altitudes of hazardous weather cells based on a 3D volumetric buffer of weather information. Processor 12 then uses those altitudes and the hazardous weather cells to determine the altitude at which weather icons 56A-56C should be displayed in vertical profile display 80. In some examples, weather blocks 52 may be used as a guide for where to place weather icons 56A-56C. For instance, if a weather block represents a location for a particular type of hazardous weather, then processor 12 may display a weather icon representing that particular type of hazardous weather at a midpoint altitude of that weather block and overlaid on top of the weather block. In another example, if a group of adjacent weather blocks all represent a location for a particular type of hazardous weather, then processor 12 may display a weather icon representing that particular type of hazardous weather at some location within the group of adjacent weather blocks and overlaid on top of the weather blocks. In another example, if only a portion of the weather block is associated with the particular type of hazardous weather, processor 12 may display a weather icon either at the particular altitude that the particular type of hazardous weather is present at or at a general midpoint of the weather block.

While plurality of weather blocks 52 may be configured to depict different levels of hazardous weather, weather icons 56A-56C may help a pilot more quickly ascertain the type of hazardous weather associated with the weather blocks.

In the example of FIG. 5, in response to determining primary weather 48 includes hazardous weather 82, processor 12 can generate vertical profile display 80 to include an alert that indicates that if the aircraft remains on flight path 44, the aircraft may encounter a weather hazard. In FIG. 5, processor 12 generated display 80 to include hazard alerts 84 and 86. In some examples, processor 12 generates alerts 84, 86 (or other alerts) only if determining the hazardous weather is within a particular horizontal distance range (e.g., about 100 nautical miles) of the current position of the aircraft. In this way, the alerting envelope could be bounded by a distance range constraint.

Hazard alert bar 84 may highlight, for example, a horizontal bound of one or more detected weather hazards. For example, hazard alert bar 84 can have a particular color or other indicia that causes bar 84 to stand out from display 84. In addition, processor 12 may select the width (as measured in a direction substantially perpendicular to the altitude lines shown in FIG. 5) of hazard alert bar 84 and position relative to the indication of aircraft 42 or flight path 44 to indicate the horizontal bounds of one or more detected weather hazards. A user may determine, for example, the hazardous weather alert applies to the part of flight path 44 aligned with the far left side of alert bar 84 and ends at the part of fight path 44 aligned with the far right side of bar 84.

Hazard alert message 86 may include text or other graphical indicia (e.g., symbols) that indicate a weather hazard has been detected. As shown in FIG. 5, in some examples, hazard alert message 86 may contain a generic textual message, such as "WEATHER AHEAD." In other examples, hazard alert message 86 may contain a message more specific to the detected type of weather hazard, such as "HAIL AHEAD" if processor 12 determines the weather information indicates that a hail storm is in altitude band 46. In still other examples, such as the example of FIG. 5, if processor 12 determines that the indication of primary weather 48 includes hazardous weather 82, then processor 12 may generate hazard alert bar 84 together with hazard alert message 86. In some examples, hazard alert message 86 may be audibly output by processor 12 through some audio output device of user interface 18. Hazard alert message 86 may also be a time-based or a distance-based alert, whether it be audibly output, visually output, or both.

In other examples of vertical profile display 80, display 80 may include only one of the alerts 84, 86 instead of both, as shown in FIG. 5.

In some examples, processor 12 may perform a "look-ahead" function, wherein processor 12 accesses the weather information in the 3D volumetric buffer for information regarding possible hazardous weather cells that exist beyond the extent of the boundaries displayed by vertical profile display 40. From the results of the "look-ahead" function, processor 12 may output, for display by vertical profile display 40, a textual or pictorial indication of an altitude of the upcoming hazardous weather, a horizontal distance until the upcoming hazardous weather is displayer and/or reached, a time until the upcoming hazardous weather is displayed and/or reached, or a combination of the above indications. These indications may be provided by alerts 84, 86 or different alerts.

As shown in FIG. 5, in some examples processor 12 may generate vertical profile display 80 to include a graphical indication of potential radar attenuation 58. Processor 12 can implement any suitable technique to detect potential radar attenuation and generate indication 58, such as those described in U.S. Patent Application Publication No. 2010/0201565 by Ratan Khatwa, which is entitled, "ALERTING OF UNKNOWN WEATHER DUE TO RADAR ATTENUATION" and was filed on Feb. 6, 2009, the entire content of which is incorporated herein by reference.

In one or more examples, the functions described may be implemented in hardware, software, firmware, or any combination thereof. If implemented in software, the functions may be stored on or transmitted over, as one or more, instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices of apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   receiving, by a processor, weather information;
   determining, by the processor, a first altitude above which there is no hazardous weather detected based on the weather information; and
   generating, by the processor, a vertical profile display based on the weather information, wherein the vertical profile display comprises:
      a hazard band indication including an upper limit line positioned within the vertical profile display at a position that corresponds to a second altitude greater than or equal to the first altitude; and
      a plurality of hazardous weather indications, each hazardous weather indication indicating a severity of the hazardous weather at a respective point in space, wherein each hazardous weather indication is associated with a hazardous weather cell of a plurality of hazardous weather cells, wherein a first hazardous weather indication of the plurality of hazardous weather indications corresponds to a first severity level of a first hazardous weather cell of the plurality of hazardous weather cells and a second hazardous weather indication of the plurality of hazardous weather indications corresponds to a second severity level of a second hazardous weather cell of the plurality of hazardous weather cells, the second hazardous weather cell being different than the first hazardous weather cell, and the second severity level being different than the first severity level, the first hazardous weather indication being visually distinct from the second hazardous weather indication,
      wherein the second altitude is greater than or equal to a maximum altitude of the plurality of hazardous weather cells.

2. The method of claim 1, wherein determining the first altitude comprises:
   detecting, by the processor, the plurality of hazardous weather cells based on the weather information; and
   determining, by the processor, a highest altitude of the plurality of hazardous weather cells, wherein the first altitude is the highest altitude.

3. The method of claim 1, further comprising:
   determining a flight path of an aircraft; and
   detecting, based on the weather information, hazardous weather along the flight path of the aircraft, wherein determining the first altitude comprises determining the first altitude based on the hazardous weather along the flight path, and wherein the vertical profile display indicates a vertical profile view of the flight path.

4. The method of claim 1, wherein each of the hazardous weather indications comprises a respective one or more weather icons, each weather icon indicating a weather condition for a volume of space.

5. The method of claim 1, wherein the plurality of weather indications comprises a plurality of weather blocks, each weather block of the plurality of weather blocks indicating weather in a volume of space associated with the weather block.

6. The method of claim 1, wherein the hazard band indication further comprises a lower limit line displayed at an altitude of zero.

7. The method of claim 1, the method further comprising determining, by the processor and based on the weather information, a third altitude below which there is no hazardous weather, wherein the vertical profile display further comprises a lower limit line at a position within the vertical profile view corresponding to a fourth altitude less than or equal to the third altitude, wherein the upper limit line and the lower limit line define a hazard block which indicates a range of altitudes in which hazardous weather was detected, wherein the fourth altitude is less than or equal to a minimum altitude of the plurality of weather cells.

8. The method of claim 1, wherein the hazard band indication is displayed with a visual characteristic that is visually distinct from the remainder of the vertical profile display, wherein the visual characteristic is associated with the type of hazardous weather detected.

9. The method of claim 1, wherein the vertical profile display further comprises a textual altitude indication indicating an altitude of the upper limit line.

10. The method of claim 1, wherein the upper limit line has a positive horizontal length, and wherein generating the vertical profile display comprises varying the positive horizontal length of the upper limit line based on at least one of: a quality of the weather information, a severity of the weather information, a speed of an aircraft, a current altitude, a number of hazards in a vicinity of the aircraft, a size of the aircraft, or a size of the weather information.

11. The method of claim 1, wherein generating the vertical profile display comprises:
receiving, by the processor via a user interface, user input indicating a vertical margin; and
generating, by the processor, the vertical profile display based on the user input, wherein the second altitude is an altitude that is greater than the first altitude by the vertical margin.

12. The method of claim 1, further comprising detecting, by the processor and based on the weather information, the plurality of hazardous weather cells.

13. The method of claim 1, wherein the plurality of hazardous weather indications further comprises a third hazardous weather indication corresponding to a third hazardous weather cell of the plurality of hazardous weather cells different from the first hazardous weather cell and the second hazardous weather cell, wherein the third hazardous weather indication indicates a third severity level different than the first and second severity levels.

14. A system comprising:
a display; and
a processor configured to receive weather information, determine a first altitude above which there is no hazardous weather detected based on the weather information, generate a vertical profile display based on the weather information, and present the vertical profile display via the display, wherein the vertical profile display comprises:
an upper limit line positioned within the vertical profile display at a position corresponding to a second altitude greater than or equal to the first altitude; and
a plurality of hazardous weather indications, each hazardous weather indication indicating a severity of the hazardous weather at a respective point in space, wherein each hazardous weather indication is associated with a hazardous weather cell of a plurality of hazardous weather cells, wherein a first hazardous weather indication of the plurality of hazardous weather indications corresponds to a first severity level of a first hazardous weather cell of the plurality of hazardous weather cells and a second hazardous weather indication of the plurality of hazardous weather indications corresponds to a second severity level of a second hazardous weather cell of the plurality of hazardous weather cells, the second hazardous weather cell being different than the first hazardous weather cell of the plurality of hazardous weather cells, and the second severity level being different than the first severity level, the first hazardous weather indication being visually distinct from the second hazardous weather indication,
wherein the second altitude is greater than or equal to a maximum altitude of the plurality of hazardous weather cells.

15. The system of claim 14, the processor being configured to determine the first altitude by at least:
detecting the plurality of hazardous weather cells based on the weather information; and
determining a highest altitude of the plurality of hazardous weather cells, wherein the first altitude is the highest altitude.

16. The system of claim 14, wherein the processor is further configured to determine a flight path of an aircraft, and detect, based on the weather information, hazardous weather along the flight path of the aircraft, and wherein the processor is configured to determine the first altitude based on the hazardous weather along the flight path, the vertical profile display indicating a vertical profile view of the flight path.

17. The system of claim 14, wherein the plurality of weather indications comprises at least one of:
one or more weather icons, each weather icon indicating a weather condition for a volume of space; or
a plurality of weather blocks, each weather block of the plurality of weather blocks indicating weather in a volume of space associated with the weather block.

18. The system of claim 14, wherein the processor is further configured to determine, based on the weather information, a third altitude below which there is no hazardous weather, wherein the vertical profile display further comprises a lower limit line at a position within the vertical profile vie corresponding to a fourth altitude less than or equal to the third altitude, wherein the upper limit line and the lower limit line define a hazard block which indicates a range of altitudes in which hazardous weather was detected, wherein the fourth altitude is less than or equal to a minimum altitude of the plurality of hazardous weather cells.

19. The system of claim 14, wherein the vertical profile display further comprises a lower limit line displayed at an altitude of zero.

20. The system of claim 14, wherein the upper limit line has a positive horizontal length, and wherein the processor is configured to vary the positive horizontal length of the upper limit line based on at least one of: a quality of the weather information, a severity of the weather information, a speed of an aircraft, a current altitude, a number of hazards in a vicinity of the aircraft, a size of the aircraft, or a size of the weather information.

21. The system of claim 14, further comprising a user interface, wherein the processor is configured to receive, via the user interface, user input indicating a vertical margin and generate the vertical profile display based on the user input, wherein the second altitude is an altitude that is greater than the first altitude by the vertical margin.

22. A computer-readable medium including instructions that, when executed by a processor, cause the processor to:
receive weather information;
determine a first altitude above which there is no hazardous weather detected based on the weather information; and
generate a vertical profile display based on the weather information, wherein the vertical profile display comprises:
a hazard band indication including an upper limit line at a position within the vertical profile display that corresponds to a second altitude greater than or equal to the first altitude; and
a plurality of hazardous weather indications, each hazardous weather indication indicating a severity of the hazardous weather at a respective point in space, wherein each hazardous weather indication is associated with a hazardous weather cell of a plurality of hazardous weather cells, wherein a first hazardous weather indication of the plurality of hazardous weather indications corresponds to a first severity level of a first hazardous weather cell of the plurality of hazardous weather cells and a second hazardous weather indication of the plurality of hazardous weather indications corresponds to a second severity level of a second hazardous weather cell of the plurality of hazardous weather cells, the second hazardous weather cell being different than the first hazardous weather cell of the plurality of hazardous weather cells, the second severity level being different than the first severity level, the first hazardous weather indication being visually distinct from the second hazardous weather indication,
wherein the second altitude is greater than or equal to a maximum altitude of the plurality of hazardous weather cells.

* * * * *